Patented May 29, 1951

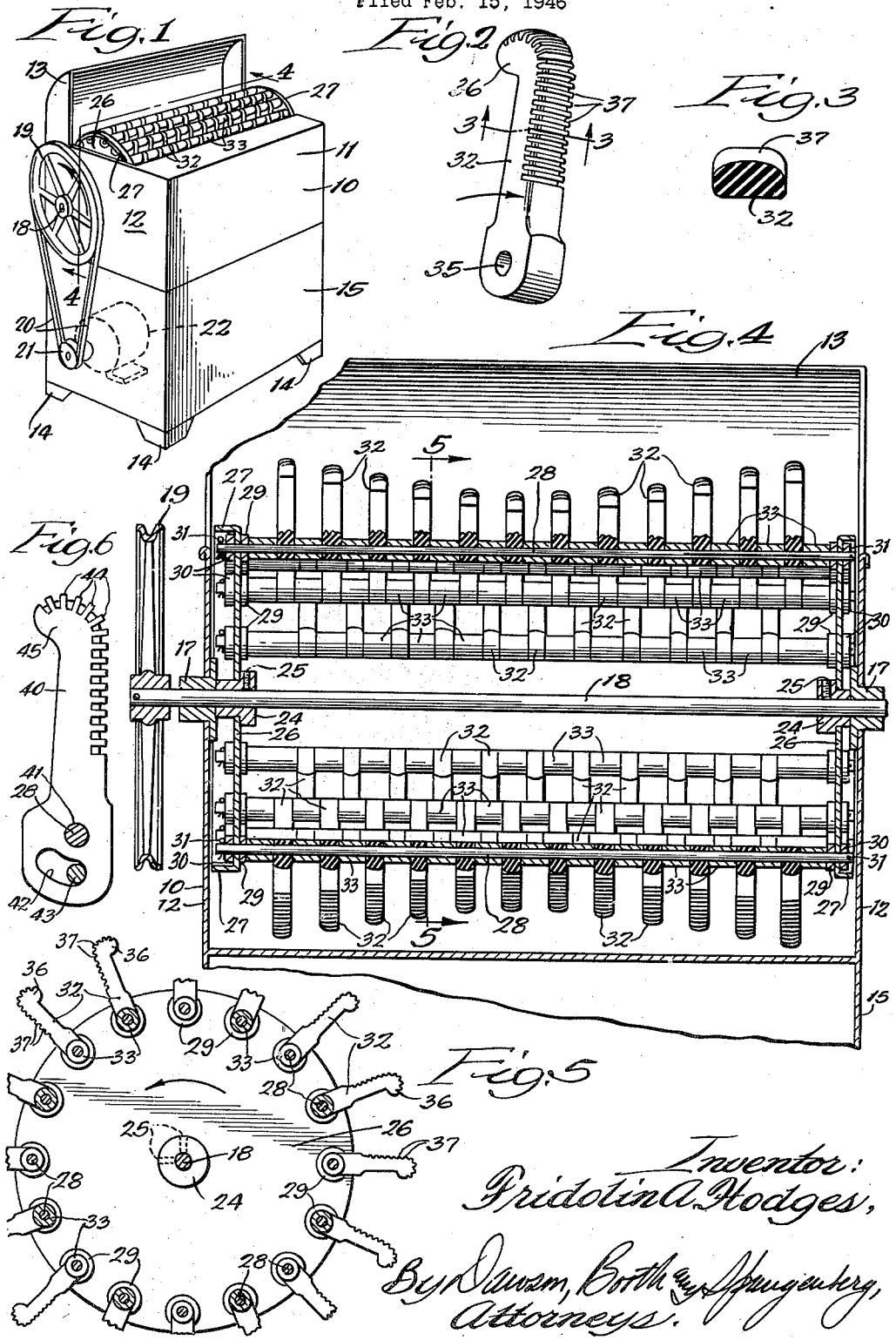

2,554,671

UNITED STATES PATENT OFFICE 2,554,671

FEATHER PLUCKER FOR POULTRY

Fridolin A. Hodges, Chicago, Ill.

Application February 15, 1946, Serial No. 647,946

6 Claims. (Cl. 17—11.1)

This invention relates to machines for plucking feathers from poultry.

Plucking feathers from poultry by hand has been an extremely tedious and time-consuming operation and in order to more rapidly and less tediously pluck feathers from poultry, machines for doing so have been developed. Such machines usually employ an enclosed rotating drum having holes on the sides thereof for rigidly receiving flexible rubber fingers. The poultry to be dressed is first scalded and then applied to the rubber fingers of the rapidly rotating drum. The rubber fingers tear the feathers from the poultry and in so doing they flex under the pressure of the poultry applied thereto and the amount of flexing depends upon the amount of pressure applied thereto. This pressure at times becomes quite high when the poultry is forcefully pressed against the fingers to remove feathers from crevices in the poultry such as under the wings and legs thereof. Of course, the rate of flexure of the rubber fingers is tremendous due to the high speed of rotation of the drum. Experience has shown that the life of the rubber fingers is limited, for the multiple flexing thereof soon deteriorates them to a point where they break. Also, the flexing action tends to loosen the fingers from the drum and in time they come loose from the drum, especially when relatively high pressures are applied thereto. The rigidly mounted rubber fingers, when flexed sufficiently to enable plucking feathers from the crevices of the poultry, often tear the skin of the poultry where the pressure between the poultry and the fingers is relatively great. Because of the closed drum arrangement and the manner of mounting the rubber fingers therein, sanitary conditions are very poor and the arrangement is difficult to clean and maintain clean.

The principal object of this invention is to provide an improved machine for plucking feathers wherein the enclosed drum and rubber fingers are entirely eliminated so that the above outlined problems and difficulties of the known machines are entirely avoided.

In carrying out this object of the invention, I provide an open rotating frame having spaced discs mounted on a rotary shaft with a plurality of circumferentially arranged rods secured between the discs. These rods pivotally carry a plurality of pivoted hammers which are extended radially by the rotary motion of the frame. The poultry to be dressed is first scalded and then applied to the extended hammers of the rapidly rotating open frame. The hammers knock the feathers from the poultry rather than tear them from the poultry as in the case of the known devices. Since the hammers are held extended by centrifugal force they may be readily depressed by the poultry when it is applied to the hammers and the force tending to extend the hammers is substantially the same regardless of whether the fingers are extended or depressed. In other words, the feather knocking force of the hammers is about the same for the depressed hammers as it is for the extended hammers. In this way the hammers may readily follow the contour of the poultry being dressed and uniformly knock the feathers therefrom including the feathers in the crevices of the poultry and they do so without any tendency to tear the skin of the poultry. Because of the pivoted hammer arrangement, the force for knocking the feathers from the poultry is ductile and uniform rather than resilient and nonuniform as is the case when stationary rubber fingers are utilized for tearing feathers from the poultry.

Preferably the hammers pivoted to the rods are spaced from each other to provide ease of operation and the hammers of adjacent rows are staggered so that all feathers are removed.

Also, the hammers may be graduated in length, being longer at the ends of the rods than at the center of the rods, so that a concave feather-knocking surface is presented. This has the effect of maintaining the poultry adjacent the center of the machine and to assist in preventing the poultry from sliding sidewise during the feather plucking operation.

Further, provision may be made for limiting the amount of pivotal movement of the hammers so that they may be depressed only a given amount. This is particularly advantageous as when cleaning heavy poultry such as turkeys and the like.

Further objects of this invention reside in the details of construction of the feather plucking machine and the operation of the various parts thereof.

Other objects and advantages will become apparent to those skilled in the art upon reference to the accompanying specification, claims, and drawing, in which—

Fig. 1 is a perspective view of the feather plucker of this invention;

Fig. 2 is a perspective view of one of the hammers utilized in the invention;

Fig. 3 is a sectional view taken substantially along the line 3—3 of Fig. 2;

Fig. 4 is a sectional view taken substantially along the line 4—4 of Fig. 1;

Fig. 5 is a sectional view taken substantially along the line 5—5 of Fig. 4; and Fig. 6 is an elevational view of a modified form of hammer.

The feather plucking apparatus includes a frame or housing 10 having a front wall 11, side walls 12, and a rear wall having an upstanding arcuate wall 13 forming a backguard for the apparatus. The housing 10 is mounted on a framework including legs 14 which may be provided with skirts 15.

The side walls 12 of the housing 10 include bearings 17 rotatably carrying a shaft 18. The shaft 18 carries a pulley 19 driven through a belt 20 by a pulley 21 operated by a motor 22 carried by the framework supporting the housing 10. The motor operates in a direction to cause counterclockwise rotation of the pulley 19 and shaft 18, as viewed in Fig. 1.

The shaft 18 carries a pair of collars 24 adjacent the bearings 17 which are held in place on the shaft 18 by set screws 25. Circular discs 26 are welded to the collars 24 and are provided around their circumferential edges with protecting flanges 27. A plurality of rods 28 extend between the discs 26 and are circumferentially spaced about the shaft 18. The rods 28 are secured to the discs 26 by nuts 29 and 30 and by cotter pins 31. The protective flanges 27 of the discs 26 overhang the nuts 30 and cotter pins 31 so that entanglement with the same is prevented. The rods 28 carry a plurality of hammers 32 which are held in spaced-apart relation by sleeves 33. As illustrated, the hammers 32 on adjacent rods 28 are staggered with respect to each other.

The hammers 32 are formed of a material such as rubber, rubber composition, plastic or wood, and are provided at one end with an opening 35 therethrough. The rods 28 extend through the openings 35 so that the hammers 32 are pivotally mounted thereon. The other end of the hammers may be provided with an enlargement or extended portion 36 on the trailing side. The leading side of the hammer 32 provides a substantially uniform striking face of substantial area and may be provided with a plurality of serrations 37 which operate to assist in knocking the feathers from the poultry.

As is clearly shown in Fig. 4, the hammers may be of progressively different lengths, being larger at the ends of the rods than at the center thereof. By reason of this construction a concave feather knocking surface is provided which acts to maintain the poultry being dressed in the center of the machine and to prevent sliding of the poultry sideways thereon.

The discs 26 carried by the shaft 18 and the rods 28 provide an open frame rotating about the axis of the shaft 18, which frame pivotally carries the hammers 32. Since the frame is open, sanitary conditions in the machine are very good and the machine may be readily cleaned.

In operation the motor 22 rotates the open frame away from the operator standing in front of the machine. As the open frame rotates the hammers 32 are held extended by the centrifugal force imparted thereto. The poultry to be dressed is grasped by the legs by the operator and is first scalded and then applied to the feather plucking machine. The poultry is laid on top of the feather knocking surface presented by the hammers 32 and as the frame rotates the hammers 32 operate to knock the feathers from the poultry. The operator then may rotate the poultry to present uncleaned portions thereof to the hammers and in this fashion all of the feathers may be removed from the poultry.

When the hammers engage the poultry in knocking the feathers therefrom, they may be depressed somewhat against the action of the centrifugal force and, of course, the amount of depression depends upon the force with which the poultry is applied to the hammers. Since the centrifugal force imparted to the hammers is substantially constant, the force for knocking the feathers from the poultry is a ductile force which is substantially uniform regardless of how far the hammers are extended or depressed. Thus the hammers may readily follow the contour of the poultry and knock the feathers from the crevices of the poultry with substantially the same force that the feathers are knocked from the other portions of the poultry. By reason of this ductile feather-knocking force, danger of tearing the skin of the poultry is at a minimum.

The feathers knocked from the poultry are generally directed down into the housing or frame 10 but in order to prevent scattering of the feathers and splashing due to the water on the feathers resulting from the prior scalding, the machine is provided with the backguard 13. The feathers are collected in the frame or housing 10 and may be removed therefrom through a suitable door arrangement in the rear thereof.

In plucking feathers from heavy poultry it may be desirable to limit the amount of depression of the hammers, the heavier poultry, such as turkeys, having a tendency to depress the hammers more than the lighter poultry, such as chickens. In this respect the hammers may be constructed as shown in Fig. 6 in which the hammer is designated at 40. It preferably is made of rubber or rubber composition although it may be made from wood of plastic. It includes a hole 41 for receiving the rod 28 of the rotating frame upon which it is pivoted as in the previous modification. It also includes an arcuate slot 42 concentric with the hole 41 for receiving a rod 43 extending between the discs 26. The rod 43 cooperating with the slot 43 limits the extent of pivotal movement of the hammer 40 about the rod 28 so that the hammer may be depressed by the poultry only through an angle determined by the extent of the arcuate slot. Thus, when heavy poultry is applied against the hammers 40 they cannot be completely depressed and will operate to knock feathers efficiently from the heavy poultry. As in the previous modification, the hammers 40 may be provided with serrations 44 and a trailing extension 45.

It is also desirable to vary the speed of rotation of the frame depending upon the weight and type of poultry being dressed. The heavier the poultry and the tougher the feathers the greater should be the speed of rotation for this applies a greater extending force to the hammers with a resultant greater feather knocking force. The speed of rotation of the frame may be adjusted by changing the pulley ratios or by electrically varying the speed of rotation of the motor.

While for purposes of illustration two forms of this invention have been disclosed, other forms thereof may become apparent to those skilled in the art and therefore this invention is to be limited only by the scope of the appended claims and prior art.

I claim as my invention:

1. A hammer for a poultry feather plucker comprising an elongated member having a leading side and a trailing side and having a hole therethrough at one end and parallel to the leading and trailing sides for pivotally mounting the hammer on the poultry feather plucker, an extended portion at the other end of the hammer on the trailing side of the hammer, and serrations on the leading side of the hammer.

2. A hammer for a poultry feather plucker comprising, an elognated member having a leading side and a trailing side and having a hole therethrough at one end and parallel to the leading and trailing sides for pivotally mounting the hammer on the poultry feather plucker, the leading side being substantially uniform and of substantial area and provided with serrations.

3. A feather plucker for poultry comprising, a rotary frame having a plurality of hammer pivoting rods parallel to the axis of rotation of the frame, a plurality of hammers pivotally mounted on the hammer pivoting rods and held extended by the rotary motion of the frame for knocking feathers from the poultry applied thereto, said pivotally mounted hammers comprising an elongated member having a leading side and a trailing side and having a hole therethrough at one end and parallel to the leading and trailing sides for receiving said hammer pivoting rods for pivotally mounting the hammers thereon, the leading sides of said hammers being substantially uniform and of substantial area and provided with serrations.

4. A feather plucker for poultry comprising, an elongated rotary frame rotatable about a longitudinal axis and comprising spaced end discs and a plurality of circumferentially spaced rods parallel to the axis of rotation of the frame for connecting the end discs and for pivotally mounting hammers, a plurality of hammers pivotally mounted on the rods and held extended by the rotary motion of the frame for knocking feathers from the poultry applied thereto, said pivotally mounted hammers comprising an elongated member having a leading side and a trailing side and having a hole therethrough at one end and parallel to the leading and trailing sides for receiving said rods for pivotally mounting the hammers thereon, the leading sides of said hammers being substantially uniform and of substantial area and provided with serrations.

5. A hammer for a poultry feather plucker comprising, an elongated member having a leading side and a trailing side and having a hole therethrough at one end and parallel to the leading and trailing sides for pivotally mounting the hammer on the poultry feather plucker, the leading side being substantially uniform and of substantial area and provided with serrations, and said hammer having an arcuate slot therethrough parallel to the hole for limiting the pivotal movement of the hammer.

6. A feather plucker for poultry comprising, a rotary frame having a plurality of hammer pivoting rods parallel to the axis of rotation of the frame, a plurality of hammers pivotally mounted on the hammer pivoting rods and held extended by the rotary motion of the frame for knocking feathers from the poultry applied thereto, said pivotally mounted hammers comprising an elongated member having a leading side and a trailing side and having a hole therethrough at one end and parallel to the leading and trailing sides for receiving said hammer pivoting rods for pivotally mounting the hammers thereon, the leading sides of said hammers being substantially uniform and of substantial area and provided with serrations, said frame having a plurality of other rods parallel to and adjacent the hammer pivoting rods, and said hammers having an arcuate slot therethrough parallel to the holes therein for receiving said other rods for limiting the pivotal movement of the hammers.

FRIDOLIN A. HODGES.

REFERENCES CITED

The following references are of record in the file of this patent:

UNITED STATES PATENTS

| Number | Name | Date |
|---|---|---|
| 1,694,018 | Mudge et al. | Dec. 4, 1928 |
| 2,300,157 | Hunt | Oct. 27, 1942 |
| 2,305,232 | Barker | Dec. 15, 1942 |
| 2,328,770 | Barker | Sept. 7, 1943 |
| 2,337,201 | Johnson | Dec. 21, 1943 |
| 2,362,371 | Haist | Nov. 7, 1944 |
| 2,412,108 | Toti et al. | Dec. 3, 1946 |

FOREIGN PATENTS

| Number | Country | Date |
|---|---|---|
| 11,143 | Great Britain | 1887 |